United States Patent
Abrol et al.

(10) Patent No.: US 7,061,913 B1
(45) Date of Patent: Jun. 13, 2006

(54) METHOD AND APPARATUS FOR DELAYED FRAME DETECTION IN THIRD GENERATION RADIO LINK PROTOCOL

(75) Inventors: Nischal Abrol, San Diego, CA (US); Arjun Khare, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 705 days.

(21) Appl. No.: 09/648,644

(22) Filed: Aug. 25, 2000

(51) Int. Cl.
*H04L 1/16* (2006.01)

(52) U.S. Cl. ...................................... 370/394; 714/748
(58) Field of Classification Search ................ 370/394; 714/748, 749
See application file for complete search history.

(56) References Cited

U.S. PATENT DOCUMENTS

| | | | |
|---|---|---|---|
| 5,930,233 A | 7/1999 | Kanerva et al. | |
| 6,076,181 A * | 6/2000 | Cheng | 714/748 |
| 6,189,122 B1 * | 2/2001 | Cheng | 714/748 |
| 6,415,410 B1 * | 7/2002 | Kanerva et al. | 714/749 |
| 6,519,223 B1 * | 2/2003 | Wager et al. | 370/216 |
| 6,618,375 B1 * | 9/2003 | Rezaiifar et al. | 370/394 |

OTHER PUBLICATIONS

Christina Parsa et al. TULIP: A Link-Level Protocol for Improving TCP over Wireless Links, Wireless Communications and Networking Conference, 1999 (pp. 1253-1257).

\* cited by examiner

*Primary Examiner*—Min Jung
(74) *Attorney, Agent, or Firm*—Philip R. Wadsworth; Thien T. Nguyen; Rupit Patel

(57) ABSTRACT

The disclosed embodiments are a novel and improved method and system that prevents RLP3 from generating unnecessary NAKs, thus preventing unnecessary data frame retransmissions. The disclosed embodiments are efficient, neither delaying the delivery of data frames to the higher data services layer nor delaying the delivery of necessary NAKs to the multiplex sublayer. The disclosed embodiments are implemented with minimal changes to existing RLP3 implementation. The disclosed embodiments utilize a buffering scheme for all incoming traffic. The purpose of this buffering scheme is to reorder the received packets into the order that they were transmitted prior to delivering them to the PPP layer. Received frames are reordered by determining the order that physical layer frames were transmitted by a peer, and by buffering each received frame until all frames transmitted prior to it have been received. The frame reordering is accomplished using timers and a memory buffering mechanism.

13 Claims, 8 Drawing Sheets

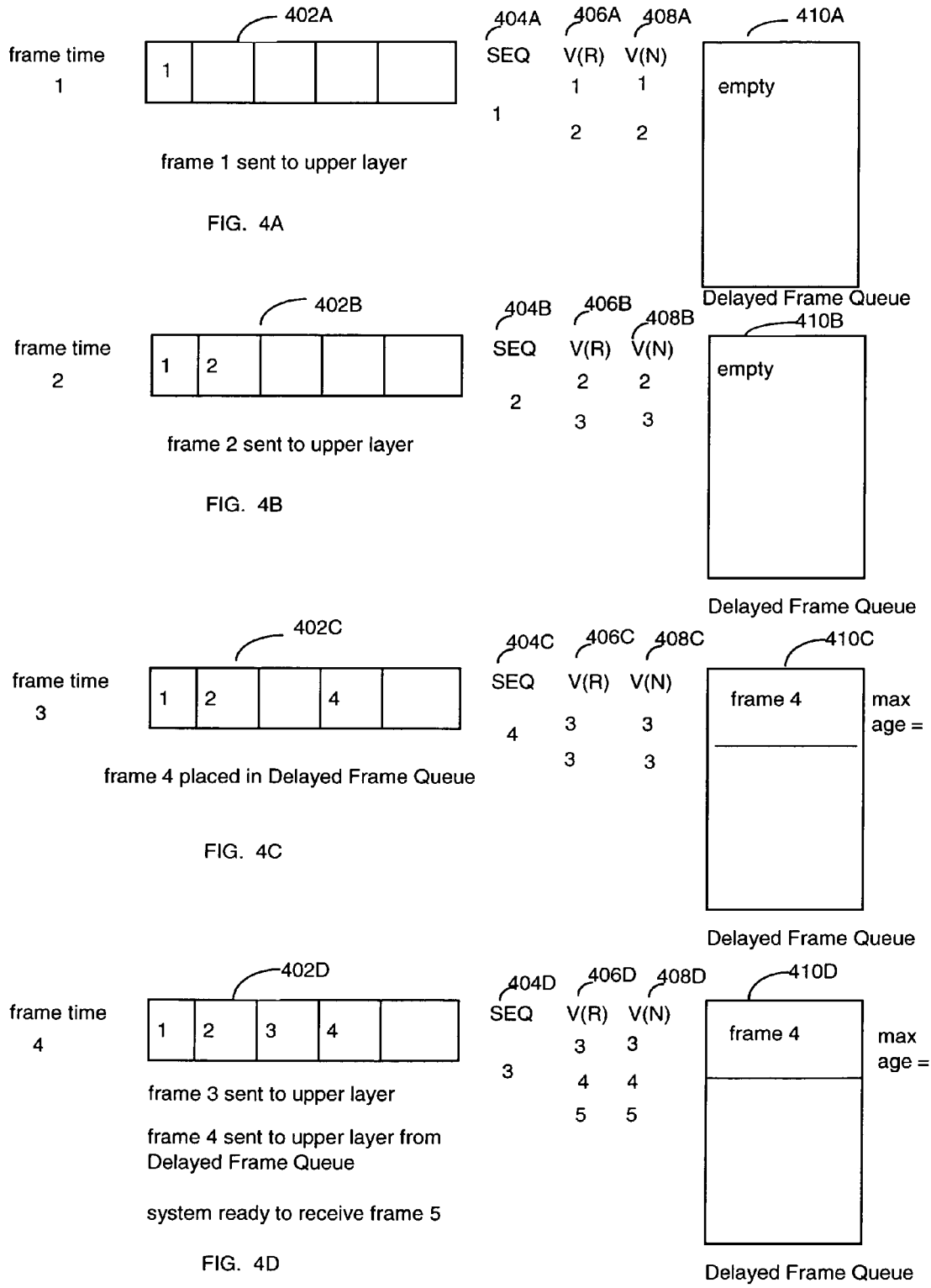

frame 1 sent to upper layer frame 2 sent to upper layer frame 4 placed in Resequencing Queue
NAKs placed in NAK Queue
NAK send timers started frame 3 sent to upper layer frame 4 sent to upper layer from Resequencing Queue NAK 3 purged from NAK Queue
NAK 3 send timers canceled

METHOD AND APPARATUS FOR DELAYED FRAME DETECTION IN THIRD GENERATION RADIO LINK PROTOCOL

BACKGROUND OF THE INVENTION

I. Field of the Invention

The current invention relates to wireless communications. More particularly, the disclosed embodiments relate to an improved method and apparatus for reliably transmitting data through a wireless channel while minimizing the overhead inherent in the error control protocol.

II. Background

The use of code division multiple access (CDMA) modulation techniques is one of several techniques for facilitating communications in which a large number of system users are present. Other multiple access communication system techniques, such as time division multiple access (TDMA), frequency division multiple access (FDMA) and Amplitude Modulation (AM) schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95-B.

IS-95-B was originally optimized for transmission of variable-rate voice frames. In order to support two-way voice communications, as typified in wireless phone applications, it is desirable that a communication system provide fairly constant and minimal data delay. For this reason, IS-95-B systems are designed with powerful forward error correction (FEC) protocols and vocoders that are designed to respond gracefully to voice frame errors. Error control protocols that require frame retransmission procedures add unacceptable delays to voice transmission, so are not part of the IS-95-B specification.

The optimizations, which make the stand-alone IS-95-B specification ideal for voice applications, make it difficult to use for packet data applications. In many non-voice applications, such as the transmission of Internet protocol (IP) data, the delay requirements of the communication system are much less stringent than in voice applications. In the Transmission Control Protocol (TCP), probably the most prevalent of protocols used in an IP network, virtually infinite transmission delays are allowed in order to guarantee error-free transmission. TCP uses retransmissions of IP datagrams, as IP packets are commonly called, to provide this transport reliability.

IP datagrams are generally too large to fit into a single IS-95-B frame. Even after dividing an IP datagram into segments small enough to fit into a set of IS-95-B frames, the entire set of IS-95-B frames would have to be received without error for the single IP datagram to be useful to TCP. The targeted frame error rate typical of an IS-95-B system make the probability of error-free reception of all segments of a single datagram very low.

As described in IS-95-B, alternative service options enable the transmission of other types of data in lieu of voice frames. Telecommunications Industry Association Interim Standard TIA/EIA/IS-707-A, entitled "DATA SERVICE OPTIONS FOR SPREAD SPECTRUM SYSTEMS", hereinafter referred to as IS-707, describes a set of procedures used in the transmission of packet data in an IS-95-B system.

Radio Link Protocol (RLP) is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2, and incorporated herein by reference. RLP2 incorporates an error control protocol with frame retransmission procedures over the IS-95-B frame layer. RLP is of a class of error control protocols known as Negative Acknowledgement (NAK) based automatic request for retransmission (ARQ) protocols, which are well known in the art. The IS-707 RLP, facilitates the transmission of a byte-stream, rather than a series of voice frames, through an IS-95-B communication system.

Several protocol layers typically reside above the RLP layer. IP datagrams, for example, are typically converted into a Point-To-Point Protocol (PPP) byte stream before being presented as a byte stream to the RLP protocol layer. As the RLP layer ignores the protocol and framing of higher protocol layers, the stream of data transported by RLP is said to be a "featureless byte stream".

RLP was originally designed to satisfy the requirements of sending large datagrams through an IS-95-B channel. For example, if an IP datagram of 500 bytes was to be simply sent in IS-95-B frames carrying 20 bytes each, the IP datagram would fill 25 consecutive IS-95-B frames. Without some kind of error control layer, all 25 of these RLP frames would have to be received without error in order for the IP datagram to be useful to higher protocol layers. On an IS-95-B channel having a 1% frame error rate, the effective error rate of the IP datagram delivery would be $(1-(0.99)^{25})$, or 22%. This is a very high error rate compared to most networks used to carry Internet Protocol traffic. RLP was designed as a link layer protocol that would decrease the error rate of IP traffic to be comparable to the error rate typical of a 10Base2 Ethernet channel.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission. The Telecommunications Industry Association is currently developing the cdma2000 proposal as interim standard TIA/EIA/IS-2000, and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as "Wideband CDMA" and hereinafter referred to as W-CDMA. A third proposal was submitted by U.S. TG 8/1 entitled "The UWC-136 Candidate Submission", hereinafter referred to as EDGE. The contents of these submissions is public record and is well known in the art.

RLP2 was designed for use with IS-95-B. A new RLP designed for use with cdma2000 is described in TIA/EIA/IS-707-A-1.10, entitled "DATA SERVICE OPTIONS FOR SPREAD SPECTRUM SYSTEMS: RADIO LINK PROTOCOL TYPE 3", hereinafter referred to as RLP3, and incorporated herein by reference.

In reference to the description of the related art, two items commonly referred to as frames have the following distinction:

In IS-95-B and cdma2000, the basic timing interval is termed a frame. A frame of this variety is hereinafter referenced as a CDMA frame. A CDMA frame can contain signaling information, primary traffic, secondary traffic, or combinations thereof.

In RLP3, the basic unit of transmission is termed a frame. A frame of this variety is hereinafter referenced as an RLP frame. An RLP frame can contain payload data, a sequence number, RLP control information (e.g. SYNC, NAK, etc.), or combinations thereof. All references to sequence numbers hereinafter are references to RLP sequence numbers.

In IS-95-B, the fundamental and supplemental channels have CDMA frames that are of a fixed 20 millisecond (20 ms) duration. CDMA frames transmitted on IS-95-B supplemental channels are transmitted at the same time that a CDMA frame is transmitted on the fundamental channel. As all IS-95-B supplemental CDMA frames are of a fixed 20 ms duration, all fundamental and supplemental CDMA frames that begin transmission at the same time will later be received by the receiver at the same time.

Cdma2000 has a supplemental channel structure that differs significantly from that of IS-95-B. Cdma2000 allows for 2 supplemental channels, hereinafter referred to as supplemental 1 and supplemental 2. During service negotiation the mobile station and the base station negotiate a configuration that includes the supplemental channel CDMA frame duration(s). The durations that can be negotiated for each supplemental channel are: 20 ms, 40 ms, and 80 ms.

As the amount of data that can be transmitted in a channel is related to the CDMA frame duration, hereinafter CDMA frame durations are referenced as CDMA frame lengths. Cdma2000 allows the negotiated configuration to be one in which the CDMA frame length for supplemental 2 is different than the CDMA frame length for supplemental 1. Any telecommunications system that supports the concurrent transmission of data packets on different code channels from one entity, such as a cdma2000 base station, capable of transmitting user data on a fundamental and supplemental channel(s) concurrently, to another entity, such as a cdma2000 mobile, is hereafter referenced as a cdma2000-like system.

In RLP2, RLP3, and all existing RLP implementations, three variables are maintained at either side of an RLP protocol link. These variables are V(R), V(N) and V(S). As discussed in the RLP standards, V(R) contains the expected value of the RLP frame sequence number field in the next new frame to be received. V(N) contains the sequence number of the next needed frame not received in sequence. The sequence number field 'SEQ' in each new RLP data frame sent, and in each RLP idle frame sent, is set to V(S). V(S) is a state variable that denotes the next sequence number to be sent. The sequence number field 'SEQ' in each new RLP data frame received contains the sequence number of the received frame, hereinafter referred to as "received SEQ number". Each of the variables V(R), V(N), and V(S), are the shortened (8-bit), over-the-air versions of the full (12-bit) sequence numbers L_V(R), L_V(N) and L_V(S) also maintained at either side of an RLP protocol link.

RLP2 and all other RLPs are essentially designed as state machines called from the multiplex sublayer every 20 ms. At each 20 ms interval, the multiplex sublayer delivers to RLP a set of frames received from the physical layer. Each time the multiplex sublayer delivers a set of frames to the RLP state machine, also known as the RLP engine, the RLP state machine compares the sequence number(s) of the just received frames to L_V(R) and L_V(N). In the event that RLP finds a new 'hole' was created, a NAK is generated. The term 'hole' is commonly used by those skilled in the art to denote that a set of frames containing non-consecutive sequence numbers was received by the RLP3 engine. A 'new hole' is created whenever the updated L_V(R) is different from the previous L_V(R), and all frames received with sequence numbers greater than the previous L_V(R) do not have consecutive sequence numbers.

RLP3 is similar to RLP2 in many respects. The similarities facilitated many benefits that code reuse and backward compatibility can provide. RLP3 was designed, as was RLP2, to associate a frame sequence number with each RLP frame transmitted and received. Whenever an unexpected sequence number is received, a request for retransmission, referred to as a NAK, is sent to the peer RLP entity.

Delayed frame detection was not implemented in RLP2 because all IS-95-B CDMA frames transmitted at the same time are received by the receiver at the same time. If an RLP2 state machine finds that a hole has been created by the receipt of a 20 ms set of frames from the multiplex sublayer, due to the simultaneous transmission of all frames on the supplemental channels, it means that the frames in the hole have been lost or corrupted en route to the receiver. As such, a NAK generated for such a hole is necessary, as the retransmission of the frames in the hole are desirable. Utilizing the same methodology, however, causes RLP3 to generate unnecessary retransmissions because of the flexible nature of the cdma200 supplemental channels. As described earlier, it is possible in cdma2000 for supplemental channels to vary in CDMA frame length. Unnecessary retransmissions may also be generated due to timing offsets when supplemental frames are clocked on a different bus than fundamental frames during transmission. Such variations and timing issues can unintentionally cause RLP3 to detect holes and cause the generation of unnecessary NAKs.

For example, FIG. 1A shows a 160 ms time interval of generated RLP data frames for an RLP3 data call with a fundamental channel and two supplemental channels. As illustrated, supplemental 1 has a CDMA frame length of 80 ms, supplemental 2 has a CDMA frame length of 40 ms, and the RLP sequence number at the beginning of this time interval is 5. At time 0 the multiplex sublayer asks the RLP engine for three frames of lengths corresponding to the frame duration of the fundamental channel and each supplemental channel. In response, the RLP engine generates three RLP frames having sequence numbers 5, 6, and 7. At the 20 ms boundary the RLP frame having sequence number 8 is generated in response to the multiplex sublayer asking for a single frame of a length corresponding to the fundamental channel. At the 40 ms boundary an RLP frame containing sequence number 9 is generated. At the 40 ms boundary the multiplex sublayer asks for a frame of length corresponding to supplemental channel 2. In response, the RLP engine generates an RLP frame having sequence number 10. At the 60 ms boundary the multiplex sublayer asks for a frame corresponding to the fundamental channel. In response, the RLP engine generates an RLP frame having sequence number 11. Likewise, RLP frames with sequence numbers 12, 13 and 14 are generated at the 80 ms boundary for like reasons. Frames 15–17 are generated for like reasons at the times illustrated in FIG. 1A. The receipt of the aforementioned frames by the receiving RLP3 engine is illustrated in FIG. 1B. FIG. 1B does not show the length/duration of the received frames, as is done in FIG. 1A. Rather, FIG. 1B shows the time that the frame is given to the RLP3 receive engine from the receiving multiplex sublayer. FIG. 1B assumes there is zero delay from the time the frame transmission completed in FIG. 1A to the time that the RLP3 receive engine has the frame delivered to it by the multiplex sublayer. For example, because the transmission of frame 5 finishes at time 20 ms in FIG. 1A, it is received by the RLP3 receive engine at time 20 ms in FIG. 1B. Because the transmissions of frames 7 and 8 complete at 40 ms in FIG. 1A, they are received for processing by the RLP3 engine at 40 ms in FIG. 1B. Likewise, because the transmissions of frames 6 and 10 complete at time 80 ms in FIG. 1A, these frames are received for processing by the RLP3 receive engine at time 80 ms in FIG. 1B. The receipt of frame 9, and frames 11 through 18, are diagrammed in a similar manner.

As is evident by comparison of the figures, RLP frames transmitted with ordered incremental sequence numbers are not received in order by the receiving RLP engine. Although the frames began transmission in the same sequence that the RLP3 generated the sequence numbers, the frames were received in a different order. Namely, CDMA frames containing RLP sequence numbers 5 through 17 were transmitted in the following order 5,6,7,8,9,10,11,12,13,14,15,16,17, 18 yet were received in the order of 5,8,7,9,11,6,10,12,15, 14,16,18,13,17 owing to the differences in frame duration. As would be evident to one skilled in the art, NAKs would be generated for frames 6,7,10,13, 14, and 17 due to the timing and order that frames 8, 11, 15, and 18 were received.

As one skilled in the art is aware, the generation of NAKs should only be done when the receiver fails to receive a transmission of an RLP data frame that it should have already received. However, due to the varying CDMA frame lengths of cdma2000, or differences in transmission timing on fundamental and supplemental channels, unnecessary NAKs can be generated due to the timing that sequence numbers are received. This causes the undesirable effect of wasting valuable bandwidth both on the forward and reverse links. The bandwidth is wasted by each NAK transmitted on one link and by the unnecessary retransmitted data frame on the opposite link (an unnecessary retransmitted data frame is generated for each received unnecessary NAK).

Because over-the-air bandwidth is a valuable resource, an improved method of delivering data over cdma2000 is desirable. In particular, a method for delivering data over cdma2000 that doesn't generate unnecessary NAKs and retransmissions is highly desirable. It is desirable that such a method neither increases the latency of the delivery of data frames to the protocol layer above RLP nor increases the latency of the delivery of valid NAK frames to the multiplex sublayer. It is particularly desirable that such a method require few, if any, changes to existing implementations of RLP3, and no changes to the RLP3 standard.

SUMMARY OF THE INVENTION

A novel and improved method and apparatus for delayed frame detection in RLP3 is presented. The method and apparatus prevent RLP3 from generating unnecessary NAKs, thus preventing unnecessary data frame retransmissions. The disclosed embodiments are efficient, neither delaying the delivery of data frames to the higher data services layer, nor delaying the delivery of necessary NAKs to the multiplex sublayer. Additionally, the disclosed embodiments can be implemented with few changes to existing RLP3 implementation, and no changes to the RLP3 standard.

Accordingly, in one aspect of the invention, a method for detecting delayed RLP frames, and preventing the transmission of unnecessary NAK messages and data frame retransmissions, comprising the steps of buffering an unsequentially received RLP frame, and withholding the transmission of a NAK message for delayed RLP frame until the delayed RLP frame has been missing longer than a predefined time.

In another aspect of the invention, a wireless communications device configured to detect delayed RLP frames, and prevent the transmission of unnecessary NAK messages and data frame retransmissions, comprising a processor; and a storage medium coupled to the processor and containing a set of instructions executable by the processor to buffer an unsequentially received RLP frame; and withhold the transmission of a NAK message for a delayed RLP frame until the delayed RLP frame has been missing longer than a predefined time period.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein:

FIG. 4A–4E illustrate RLP frame reception and memory structure management used by the delayed frame detection method diagramed in FIG. 3;

DETAILED DESCRIPTION OF THE PREFERRED EMBODIMENTS

The disclosed embodiments are applicable to systems such as cdma2000, W-CDMA, and EDGE, wherein data is transferred using an ARQ (automatic request for retransmission) mechanism, and wherein data packets are sometimes received in an order different from the order in which they were transmitted.

Figure 2:
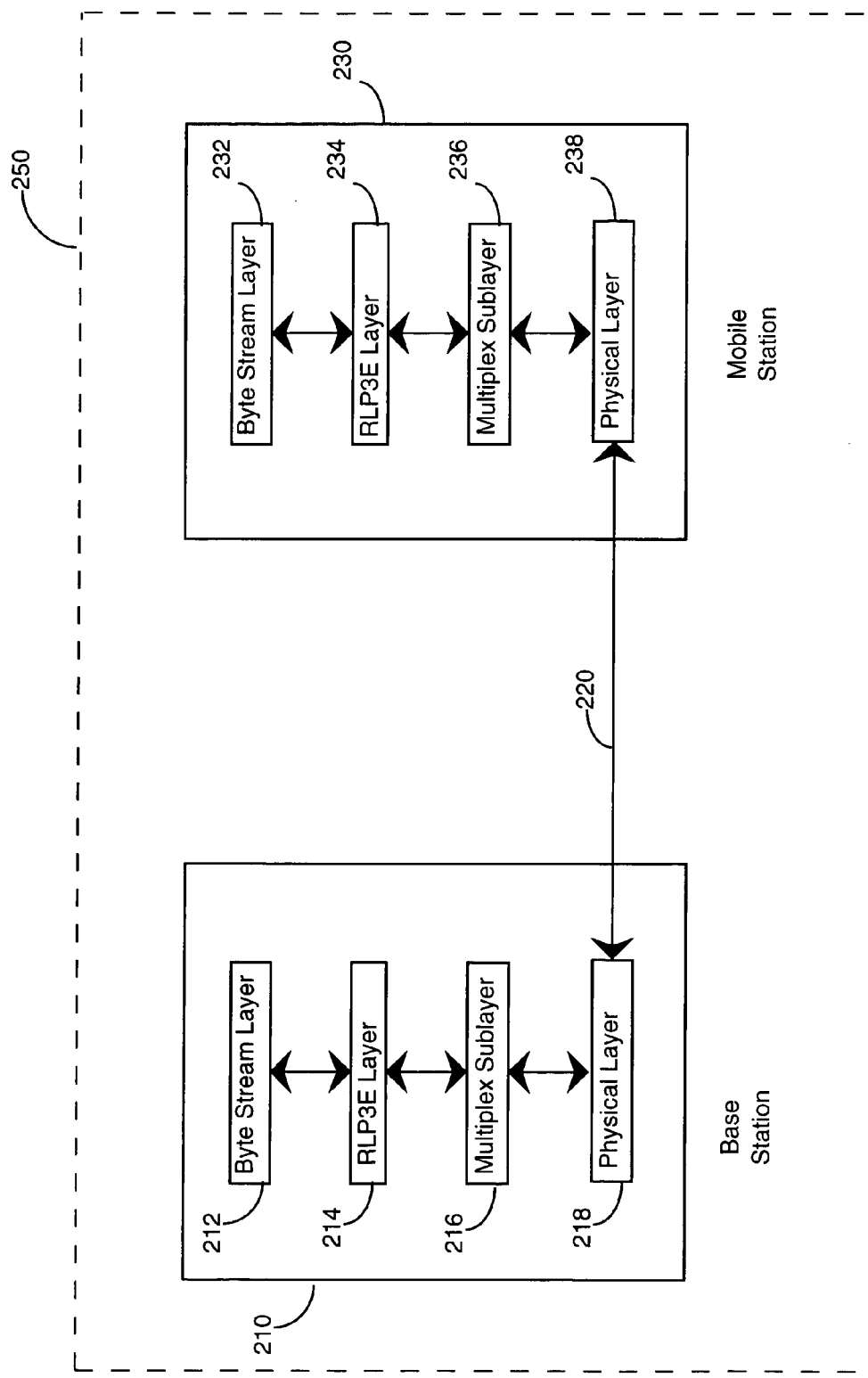
FIG. 2 is a functional block diagram of an exemplary embodiment of a cdma2000 RLP3 transmission system.

In relation to the transmission and receipt of RLP frames, RLP3 currently communicates with a multiplex sublayer below it and a byte stream layer above it. The byte stream layer is commonly referred to as the Point to Point Protocol (PPP) layer, because PPP is commonly the protocol used in the byte stream layer. However, as the byte stream layer need not be PPP (the byte stream layer could be ISDN, or one of a plurality of protocols), it is herein referred to as the byte stream layer. The aforementioned communication flow is illustrated in FIG. 2, a block diagram showing the data path for cdma2000.

The disclosed embodiments utilize a new method for processing all incoming traffic. The purpose of this method is to reorder the received packets into the order that they were transmitted, and to deliver the packets to the byte stream layer in said order without generating unnecessary NAKs and data frame retransmissions for delayed RLP frames.

The disclosed embodiments reorder received RLP frames by determining the order that physical layer RLP frames were transmitted by a peer, and by buffering each received RLP frame until all RLP frames transmitted prior to it have either been received, or been determined to be missing (lost or corrupted over the air). The method accomplishes RLP frame reordering and NAK management by means of a memory buffering mechanism and counters and/or timers.

Figure 1A:
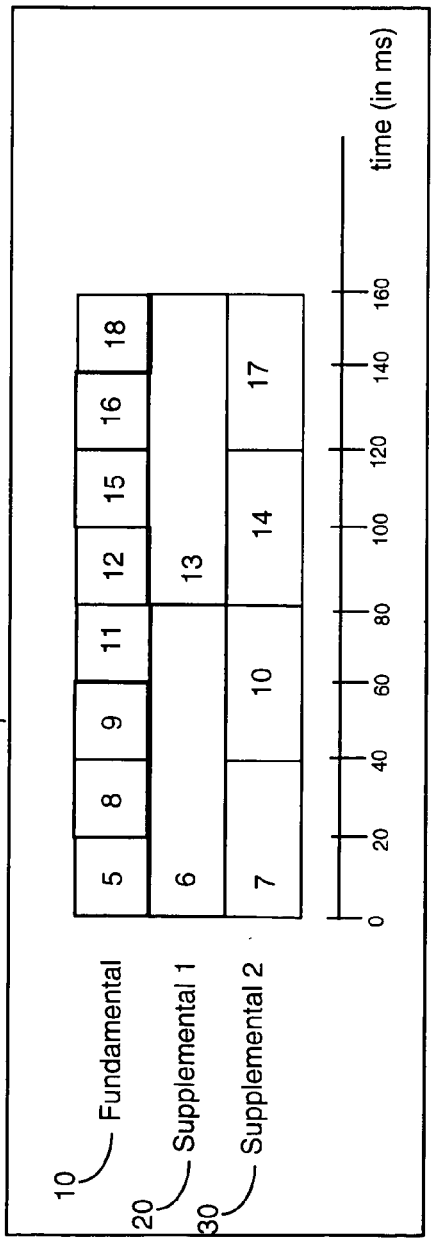
FIGS. 1A and 1B are timeline diagrams illustrating the time relationship of data frames transmitted and received on the exemplary multi-channel data network similar to cdma2000.
Figure 1B:
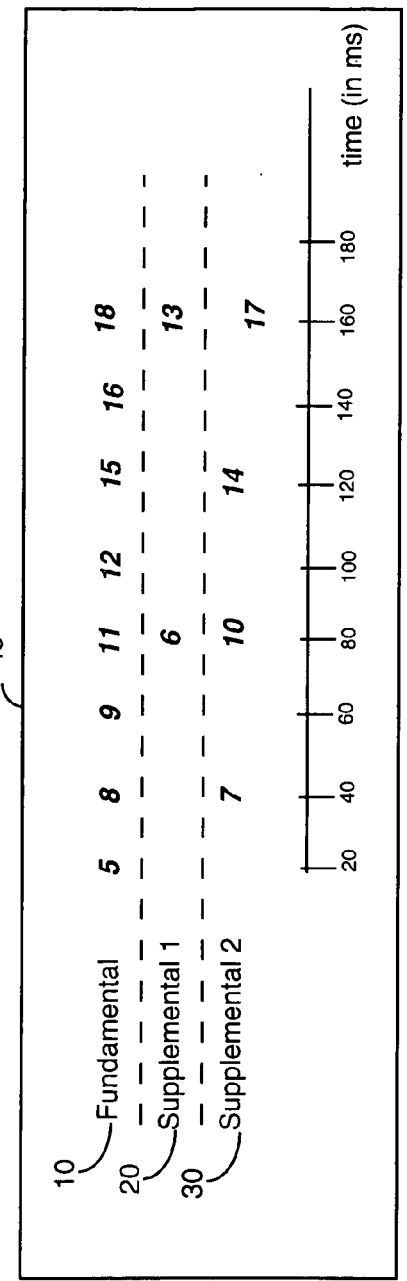

FIG. 1A and FIG. 1B are timeline diagrams illustrating the time-relationship of data frames transmitted and received on a wireless data network similar to cdma2000. FIG. 1A illustrates a 160 ms time interval of RLP data frames generated for an RLP3 data transmission system 5 consisting of a fundamental channel 10 and two supplemental channels 20,30. A first supplemental channel 20 is configured to an 80 ms CDMA frame duration, while a second supplemental channel 30 is configured to a 40 ms CDMA frame duration. The illustration assumes that at the beginning of the 160 ms time interval, the RLP3 engine has V(S) set to 5. As illustrated, fundamental channel 10 transmits 20 ms CDMA frames containing RLP3 frames of sequence numbers 5,8, 9,11,12,15,16 and 18. A first supplemental channel 20 transmits 80 ms CDMA frames containing RLP3 frames of sequence numbers 6 and 13. A second supplemental channel 30 transmits 40 ms RLP frames containing RLP3 frames of sequence numbers 7, 10, 14 and 17. As illustrated in FIG. 1A, the frames having sequence numbers 5, 6, and 7 begin transmission at time 0. Frame 5, the CDMA frame containing an RLP3 frame of sequence number 5, finishes transmission on Fundamental channel 10 at time 20. Frame 6 finishes transmission on first supplemental 20 at time 80, and frame 7 finishes transmission second supplemental 30 at time 40. The times at which frames 8–18 begin and end transmission are illustrated in a similar manner.

FIG. 1B illustrates a 160 ms time interval of RLP data frames received for an RLP3 data reception system 45 consisting of fundamental channel 10, first supplemental channel 20, and second supplemental channel 30. FIG. 1B illustrates the times at which the data frames transmitted in FIG. 1A are received by a peer cdma2000 communications device. The supplemental and fundamental channels are labeled 10, 20, and 30 in FIG. 1B to indicate that these are references to the same channels used by transmission system 5 in FIG. 1A. As illustrated, RLP3 data reception system 45 receives RLP3 frame immediately following their completed transmission by RLP3 data transmission system 5. Introduction of an arbitrary propagation delay common to fundamental channel 10, the first supplemental channel 20, and the second supplemental channel 30, does not alter the explanation and has been omitted for the sake of simplicity. Frame 5 is received by RLP3 data reception system 45 on fundamental 10 at time 20. Frame 6 is received by RLP3 data reception system 45 on first supplemental 20 at time 80. Frame 7 is received by RLP3 data reception system on second supplemental 30 at time 40. The times at which frames 8–16 are received are illustrated in a similar manner.

By examination of both FIG. 1A and FIG. 1B it is evident that the frames are received by RLP3 data reception system 45 in a different order than they were transmitted in by RLP3 data transmission system 5.

FIG. 2 is a functional block diagram of an exemplary embodiment of a cdma2000 data transmission system 250 embodied in communication devices base station 210 and mobile station 230. For illustrative purposes, the cdma2000 data transmission system is described in terms of transmission of packet data on the forward link. However, the teachings are easily extended to apply to reverse link transmissions. In base station 210, there exists a byte stream layer 212 that provides a stream of bytes to RLP3 layer 214. RLP3 layer 214 buffers these bytes for later transmission. Multiplex sublayer 216 requests RLP frames from RLP3 layer 214. In response, RLP3 layer generates RLP frames in accordance with the RLP3 specification and provides them to multiplex sublayer 216. The RLP3 specification does not specify that the RLP3 layer shall assign frame sequence numbers in accordance with the frame lengths requested by the multiplex sublayer. In the exemplary embodiment, multiplex sublayer 216 encapsulates these RLP frames in accordance with the cdma2000 specification. Multiplex sublayer 216 then provides these encapsulated RLP frames to physical layer 218 for transmission over cdma2000 air link 220 in accordance with the cdma2000 specification. When providing frames to physical layer 218, multiplex sublayer 216 indicates which frames are to be transmitted on which channels.

Physical layer 238, of mobile station 230, receives frames from cdma2000 air link 220. At 20 ms intervals, physical layer 238 provides each received frame to multiplex sublayer 236, and indicates to multiplex sublayer 236 the channel that each frame was received on. Multiplex sublayer 236 unencapsulates the RLP frames in accordance with the cdma2000 specification and provides the RLP frames to RLP3 layer 234. RLP3 layer 234 performs RLP frame processing on these frames in accordance with the RLP3 specification. In the event that any received frame has a sequence number equal to V(N) the payload of all received RLP frames having consecutive sequence numbers beginning with V(N) are provided to byte stream layer 232 by RLP3 layer 234. In the event that a new hole is created, a AK is generated to signal that one or more data frames need to be retransmitted, while the unsequentially received frame is buffered.

The above description describes an exemplary embodiment of cdma2000 data flow in the forward link direction. As is known by one skilled in the art, data flow occurs in the reverse link direction along a path in the opposite direction.

FIGS. 3 through 7 illustrate embodiments presenting a novel method of detecting RLP3 frames that are merely delayed, and not lost or corrupted. The presented embodiments disclose a novel method of preventing unnecessary NAKs, and resulting RLP frame retransmissions, when delayed frames are detected. The disclosed embodiments buffer unsequentially received RLP frames and withhold the transmission of NAK messages until delayed RLP frames have been missing longer than a tolerated time period, using timers and or counters.

Figure 3:
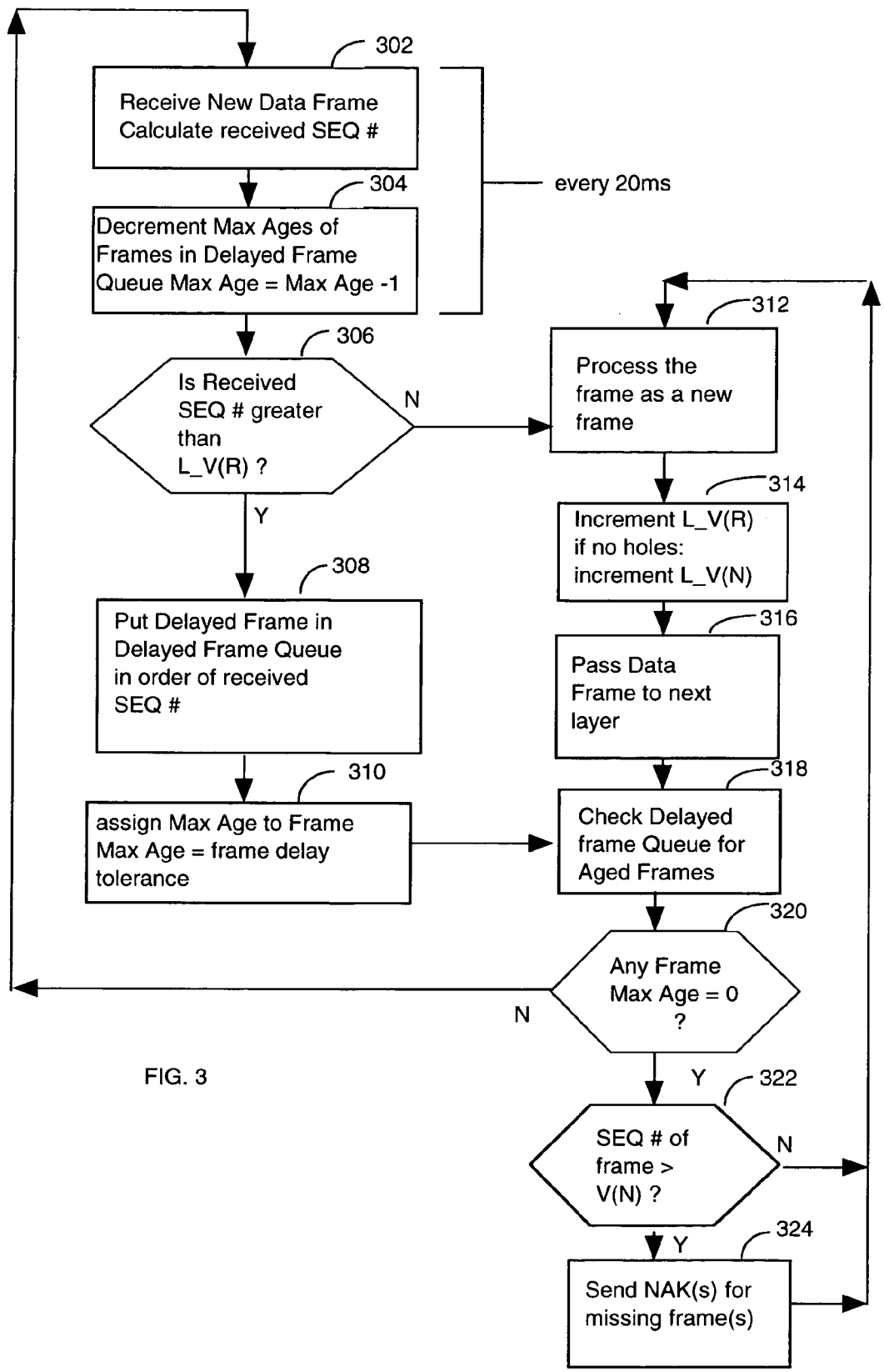
FIG. 3 is a flowchart diagram of a method for implementing delayed frame detection in RLP3.

FIG. 3 is a flow chart diagram illustrating one embodiment of delayed frame detection in RLP3. In block 302, at 20 ms intervals, RLP frames are received. In this embodiment, the expected sequence number, L_V(R), is not updated until delayed frames have been received. When a new RLP frame is received, its full internal sequence number, received SEQ number, is calculated using its 8 bit over the air SEQ bits and 4 SEQ_HI bits of the current L_V(R).

Every 20 ms frame time, age counters of any RLP frames previously buffered in a delayed frame queue are decremented in block 304.

In block 306, the received SEQ number is compared to the current L_V(R). In order to delay updating L_V(R), all unsequentially received RLP frames are buffered in the delayed frame queue. Without delayed frame detection for RLP3, received RLP frames with a received SEQ number greater than the sequence number of the next expected frame, V(R), would generate an unnecessary NAK for delayed frames. New RLP frames with a sequence number less than L_V(R) are discarded.

If the received RLP frame has a received SEQ number greater than L_V(R), indicating an unsequentially received RLP frame, or a hole, the RLP frame is inserted into the delayed frame queue buffer in order of received SEQ number in block 308. The delayed frame queue buffer is maintained every 20 ms frame time by an age counter, hereinafter referred to as Maximum Age. For example, a system may tolerate a frame delay of 1 frame. Each RLP frame in the delayed frame queue buffer has a Maximum Age counter that is decremented every frame time until it reaches 0. When the Maximum Age counter of an RLP frame reaches 0, the RLP frame is processed as a new RLP frame. Unsequentially received RLP frames are stored in the delayed frame queue buffer in the order of received SEQ numbers. When a received RLP frame is placed in the delayed frame queue due to the receipt of a received SEQ number that is greater than the sequence number expected, a hole has been created in place of the expected RLP frame.

In block 310, the age counter of the RLP frame placed in the delayed frame queue in block 308 is initialized to the frame delay tolerance of the system, i.e Max Age=frame delay tolerance of the system. Control passes to block 318. The size of the delayed frame queue depends on the frame delay tolerance of the system, or the number of frames of delay for which the receiver is compensating. When an RLP frame is added to the delayed frame queue, the frame is given a Maximum Age. The Maximum Age is decremented every 20 ms. A buffered RLP frame becomes zero aged when the Maximum Age counter for the frame has been decremented to zero. When the age of the unsequential RLP frame becomes zero aged, the RLP frame is then processed as a new RLP frame. At this point, a necessary NAK (or NAKs) may be created for missing RLP frames, i.e. RLP frames that have been delayed longer than the delay tolerance of the system. If the received SEQ number of the zero aged RLP frame is greater than V(R), a NAK is issued for missing RLP frame number V(N). In a system where the frame delay tolerance is more than one frame time, a NAK may be issued for missing frames V(N) through V(R).

In block, 318, the delayed frame queue buffer is checked for RLP frames with Maximum Age counters that have reached zero during the current frame time.

If in block 320, there are no RLP frames in the delayed frame queue with age values of zero or with sequence numbers equal to the next expected RLP frame, the system is ready to receive the next new RLP frame in block 302. If in block 320, any RLP frame's Maximum Age has reached zero, the received SEQ number of the zero aged RLP frame is compared to L_V(R) in block 322.

If in block 322, the received SEQ number of the zero aged RLP frame is greater than V(R), indicating a hole, or a delayed RLP frame missing longer than the frame delay tolerance of the system, a NAK is issued for the missing RLP frame or frames in block 324 and control passes to block 312 where the zero aged RLP frame is processed as a new RLP frame.

If in block 322, the received SEQ number of the zero aged RLP frame is not greater than V(R), or if in block 306, the currently received RLP frame has a received SEQ number equal to L_V(R) indicating a sequentially received RLP frame, control passes to block 312, where the RLP frame is processed as a new RLP frame regardless of whether the RLP frame was newly sequentially received or became zero aged while stored in the delayed frame queue buffer.

In block 314, L_V(R) is incremented in order to receive the next sequential RLP frame. If there are no holes, L_V(N) is also incremented. When there are no holes, L_V(N) is equal to L_V(R). When there are no holes, L_V(N) tracks L_V(R), as the next needed RLP frame will also be the next expected RLP frame. However, if a hole exists, L_V(N) is not incremented. When a hole is filled, L_V(N) either takes the value of the next hole, or the value of L_V(R) if there are no more holes.

The RLP frame is passed to the next protocol layer in block 316. When a currently received RLP frame has either been passed to the next protocol layer or buffered in the delayed frame queue, and there are no RLP frames in the delayed frame queue with age values of zero, the system is ready to receive the next new RLP frame in block 302.

To make delayed frame detection in RLP3 highly efficient, another embodiment avoids aging each unsequential RLP frame separately. Instead, N sub-arrays are maintained in the delayed frame queue, which compensate for N−1 number of frames of delay. If, for example, the receiver is compensating for a typical case of only one frame delay, all the frames received in a 20 ms interval, that would have caused L_V(R) to be incremented are placed in sub-array 0 in a sorted order. In the next 20 ms interval all of the frames received that would have caused L_V(R) to be incremented are placed in sub-array 1 in a sorted order. At the end of the 20 ms interval, all the preexisting RLP frames in sub-array 0 are processed as new RLP frames. At this time L_V(R) may be incremented and a NAK(s) may be generated for missing RLP frame(s).

FIGS. 4A–4E illustrate possible RLP frame reception and memory structure management scenarios of the RLP3 delayed frame detection embodiment diagramed in FIG. 3. The scenarios illustrate received RLP frames, the received SEQ number, RLP state variable values of V(R), V(N), and the contents of the delayed frame queue over a period of four frame times.

In FIG. 4A, a first RLP frame 402A is received with a received SEQ number 404A of 1. Before the RLP frame is received, the expected sequence number, V(R) 406A equals 1. Because the sequence number of the received RLP frame, SEQ 404A equals the expected sequence number V(R) 406A, the RLP frame is processed as a sequentially received new RLP frame and passed to the next protocol layer. V(R) 406A is incremented to 2. V(N) 408A is also incremented to 2, and the delayed frame queue 410A is empty, as no unsequential RLP frames have yet been received (there are no holes).

In FIG. 4B, a second RLP frame 402B is received with a received SEQ number 404B of 2. Before the RLP frame is received, the expected sequence number, V(R) 406B equals 2. Because the sequence number of the received RLP frame, SEQ, 404B equals the expected sequence number V(R) 406B, the RLP frame is processed as a sequentially received new RLP frame and passed to the next protocol layer. V(R) 406B is incremented to 3. Again, V(N) 408B is also incremented to 3, and the delayed frame queue 410B is empty, as no unsequential RLP frames have yet been received (there are no holes).

In FIG. 4C, a third RLP frame 402C is received with a received SEQ number, SEQ 404C of 4. Before the RLP frame is received, the expected sequence number, V(R) 406A equals 3. A hole has been created where RLP frame 3 was delayed. Because the received SEQ number of the received RLP frame 404C is greater than the expected sequence number V(R) 406C, the RLP frame is placed in the delayed frame queue 410C. For exemplary purposes, the system will have a frame delay tolerance of one frame time. Thus, the Maximum Age of RLP frame 4 is initialized to 1, the example frame delay tolerance of the system. V(R) 406C and V(N) are not incremented, retaining their values of 3.

In FIG. 4D, a fourth RLP frame 402D is received with a received SEQ number, SEQ 404D of 3. In other words, the delayed RLP frame 3 has arrived out of sequence, one frame time after RLP frame 4 was received, filling the hole for RLP frame 3. The maximum age of RLP frame 4 in the delayed frame queue is decremented from 1 to zero. Before the RLP frame is received, the expected sequence number, V(R) 406D equals 3. Because the received SEQ number of the received RLP frame, SEQ 404D, equals the expected sequence number V(R) 406D, the RLP frame is processed as a sequentially received new RLP frame and passed to the next protocol layer. At this time, RLP frames 1 through 3 have been passed to the next protocol layer. V(R) 406D is incremented to 4. V(N) 408D is also incremented to 4, as there are no more holes. The delayed frame queue 410D is checked and RLP frame 4 is found to have a zero age causing RLP frame 4 to be passed to be sequentially passed to the next protocol layer. V(R) and V(N) are incremented to 5, the next sequential RLP frame, and the system is ready to receive the next new RLP frame.

Figure 4E:
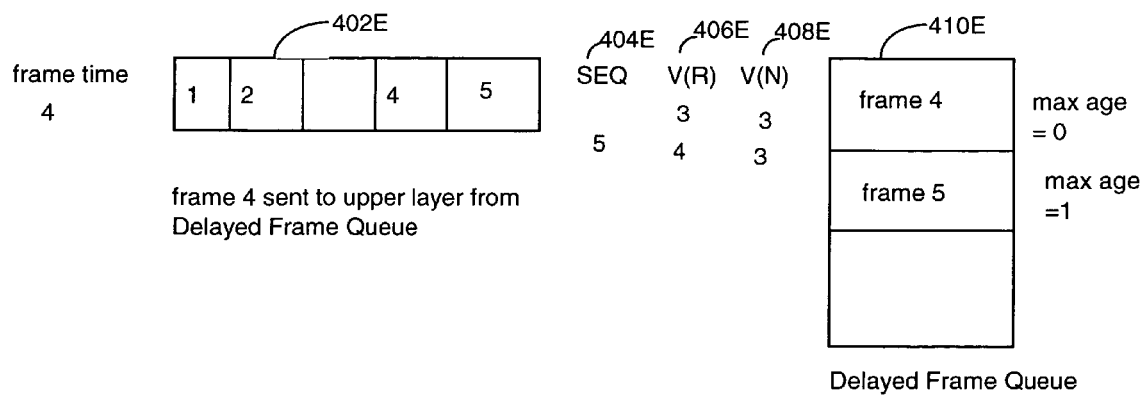

In FIG. 4E, a forth RLP frame 402E is received with a received SEQ number, SEQ, 404E of 5, instead of received SEQ number 3 404D, as in FIG. 4D. The hole for RLP frame 3, filled in FIG. 4D, is not filled in FIG. 4E. Instead, frame 5 is received, causing a NAK to be transmitted for frame 3. The maximum age of RLP frame 4 in the delayed frame queue is decremented from 1 to zero. Before the RLP frame is received, the expected sequence number, V(R) 406E equals 3. Because the sequence number of the received RLP frame, SEQ 404E, is greater than the expected sequence number V(R) 406E, the RLP frame 5 is placed in sequential order in the delayed frame queue 410E and assigned a max age of 1. The delayed frame queue 410E is checked for zero aged RLP frames, where RLP frame 4 has reached zero age. The received SEQ number of the zero aged buffered RLP frame, 4 is greater than V(N), which is equal to 3. A NAK is sent for RLP frame 3. RLP frame 4 is processed as a new RLP frame and passed to the upper protocol layers. RLP frame 5 remains in the delayed frame queue. V(R) 406E is incremented to 4, but since the hole for RLP frame 3 has not been filled, V(N) is not incremented, retaining its value of 3.

Figure 5:
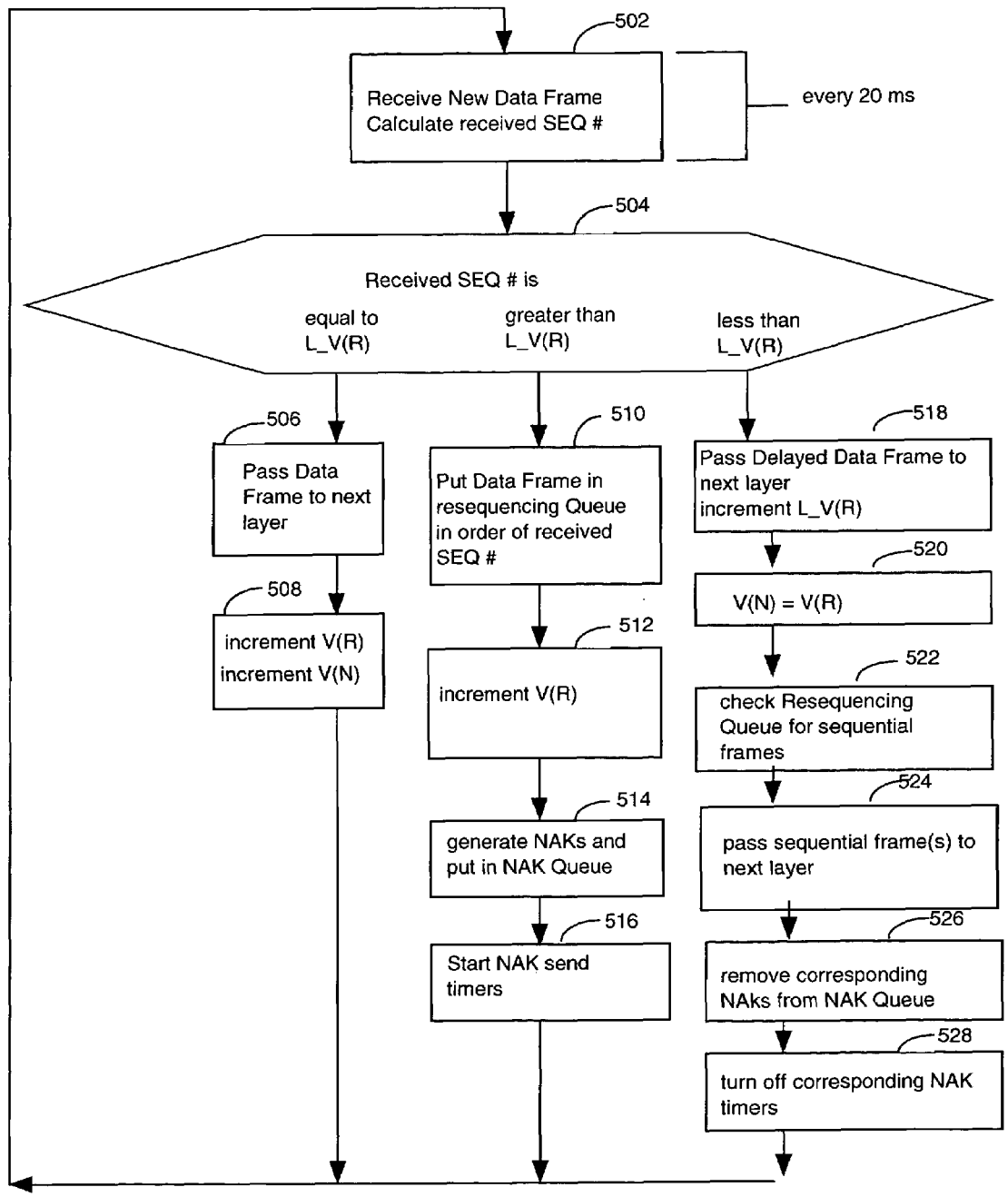
FIG. 5 is a flowchart diagram of an alternative method for implementing delayed frame detection in RLP3.

FIG. 5 is a flow chart diagram illustrating another embodiment of delayed frame detection in RLP3.

In the embodiment illustrated in FIG. 5, updates of L_V(R) and L_V(N) are done normally, with no special processing for delayed frames. The illustrated embodiment increments the state variables and creates NAKs for holes as in versions of RLP without delayed frame processing. However, NAKs are not issued upon creation, but buffered and timed to prevent issuance of unnecessary NAKs. Delayed RLP frames are processed as RLP frames that would generate a NAK. When the received SEQ number of a received RLP frame is greater than expected, V(R) is incremented and a NAK is generated, as without delayed frame processing. However, the NAKs are not immediately issued. Instead, to prevent unnecessary NAKs for delayed RLP frames, the NAKs are stored in a NAK queue. Three timers are started such that if the missing RLP frame arrives (the hole is filled), any timers for the arrived frame are turned off and the NAKs for the arrived frame are purged from the queue. If timer 1 expires and the delayed RLP frame has still not arrived, one NAK is issued. If timer 2 expires before the delayed RLP frame arrives, two NAKs, are issued, and if timer 3 expires before the delayed RLP frame arrives, three NAKs are issued. One skilled in the art would understand that the NAK scheme described above for exemplary purposes can be specified and changed by use of variable RLP_BLOB as described in IS-707.

In block 502, at 20 ms intervals, RLP frames are received. When a new RLP frame is received, the received SEQ number is calculated using its 8 bit over the air SEQ bits and 4 SEQ_HI bits of the current L_V(R).

In block 504, the received SEQ number is compared to L_V(R).

If, in block 504, the received SEQ number is equal to L_V(R), the expected RLP frame has been received in sequence. Control passes to block 506, where the sequentially received RLP frame is passed to the next protocol layer. V(R) and V(N) are incremented to receive the next sequential RLP frame. Control returns to block 502.

If, in block 504, the received SEQ number is greater than L_V(R), an RLP frame has been delayed, creating a hole. Control passes the block 510 where the unsequential RLP frame is placed in a resequencing queue in order of received SEQ number. V(R) is incremented in block 512. V(N) is not incremented because a hole has been created.

In block 514, NAKs are generated for the hole and placed in a NAK queue.

In block 516, NAK send timers are started for the NAK messages. Control returns to block 502 to receive the next RLP frame.

If, in block 504, the received SEQ number is less than L_V(R), a delayed RLP frame has been received. The delayed RLP frame, better late than never, is passed to the next protocol layer in block 518.

In block 518, L_V(R) is incremented on reception of the delayed RLP frame.

Because the hole has been filled, the value of V(N) is made equal to V(R), or the next hole in block 520.

In block 522, the resequencing queue is checked for RLP frames sequential to the filled hole.

If sequential RLP frames are stored in the resequencing queue, they are passed to the next protocol layer in block 524.

The unnecessary NAKs associated with the filled hole are removed from the NAK queue in block 526.

Timers corresponding to the unnecessary NAKs are turned off in block 528. Control returns to block 502 to receive the next RLP frame.

FIGS. 6A–6D illustrate possible RLP frame reception and memory structure management scenarios of the RLP3 delayed frame detection embodiment diagramed in FIG. 5. The scenarios illustrate received RLP frames, the received SEQ number, RLP state variable values of V(R), V(N), and the contents of the resequencing queue and NAK queue over a period of four frame times.

Figure 6A:
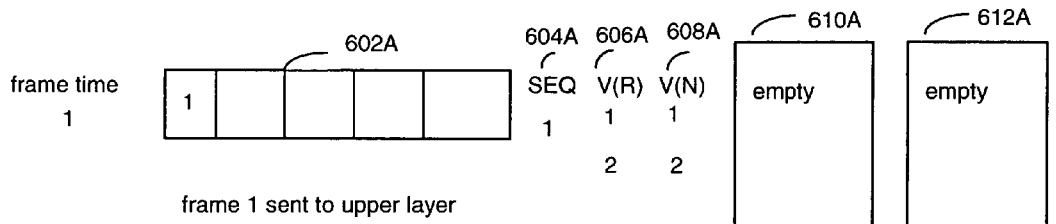
FIGS. 6A–6D illustrate RLP frame reception and memory structure management used by the delayed frame detection method diagramed in FIG. 5.

In FIG. 6A, a first RLP frame 602A is received with a received SEQ number, SEQ 604A of 1. Before the RLP frame is received, the expected sequence number, V(R) 606A equals 1. Because the received SEQ number of the received RLP frame, SEQ 604A equals the expected sequence number V(R) 606A, the RLP frame is processed as a sequentially received new RLP frame and passed to the next protocol layer. V(R) 606A is incremented to 2. V(N) 608A is also incremented to 2. The resequencing queue 610A and the NAK queue 612A are empty, as no unsequential RLP frames have yet been received (there are no holes).

Figure 6B:
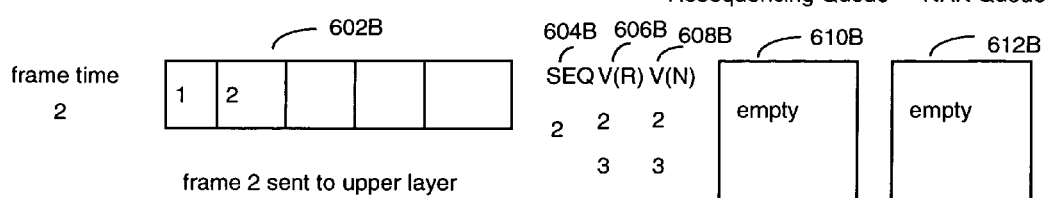

In FIG. 6B, a second RLP frame 602B is received with a received SEQ number, SEQ 604B of 2. Before the RLP frame is received, the expected sequence number, V(R) 606B equals 2. Because the sequence number of the received RLP frame SEQ 604B equals the expected sequence number V(R) 606B, the RLP frame is processed as a sequentially received new RLP frame and passed to the next protocol layer. V(R) 606B is incremented to 3. Again, V(N) 608B is also incremented to 3. The resequencing queue 610B and the NAK queue 612B remain empty, as no unsequential RLP frames have yet been received (there are no holes).

Figure 6C:
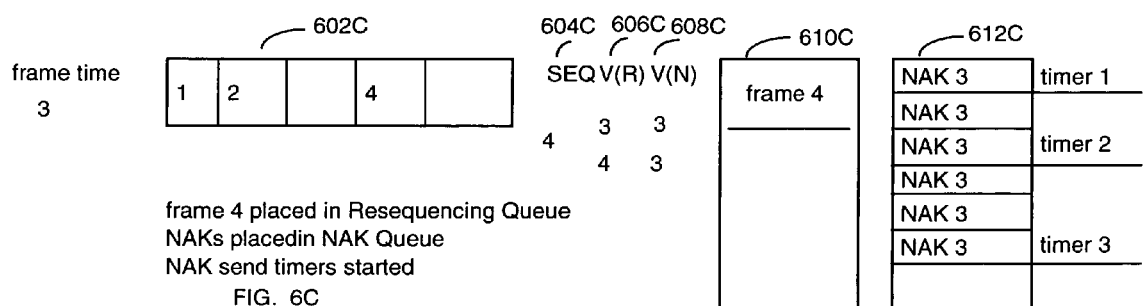

In FIG. 6C, a third RLP frame 602C is received with a received SEQ number, SEQ, 604C of 4. Before the RLP frame is received, the expected sequence number, V(R) 606A equals 3. A hole has been created where RLP frame 3 was delayed. Because the sequence number of the received RLP frame 604C is greater than the expected sequence number V(R) 606C, the RLP frame is placed in the resequencing queue 610C. V(R) 606C is incremented to 4 as usual when an RLP frame is received. V(N) is not incremented because a hole has been created, retaining its value of 3.

One NAK is generated and stored in the NAK queue 612C for a first peer notification if the hole is not filled by the time the first timer expires.

Two NAKs are generated and stored in the NAK queue 612C for a second peer notification if the hole is not filled by the time the second timer expires. Two NAKs are generated for the second notification to increase the probability that the peer will receive the NAKs if it has failed to receive the first NAK.

Three more NAKs are generated and stored in the NAK queue 612C for a third peer notification if the hole is not filled by the time the third timer expires. Three NAKs are generated for the third notification to increase the probability that the peer will receive the NAKs if it has failed to receive the first NAK as well as the second two NAKs.

Timers are started to issue the NAKs in the event that the delayed RLP frame is not received. The NAKs will only be issued if the delayed RLP frame is not received within the frame delay tolerance of the system.

Figure 6D:
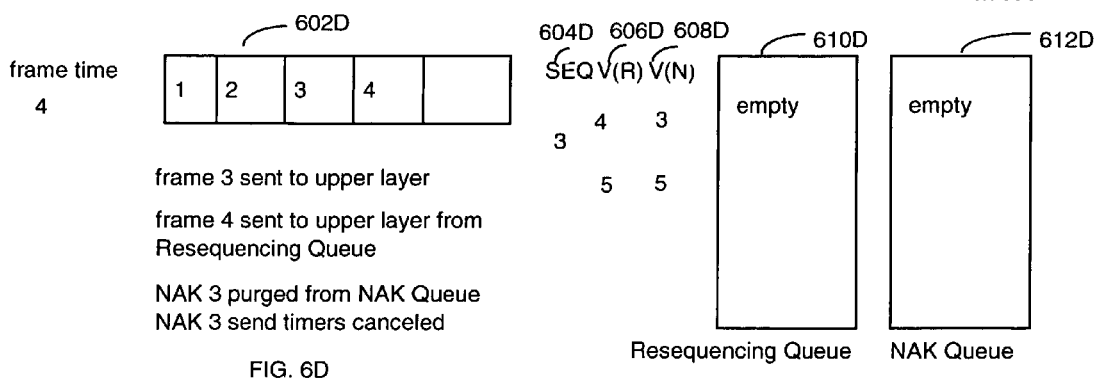

In FIG. 6D, a fourth RLP frame 602D is received with a received SEQ number, SEQ, 604D of 3. In other words, the delayed RLP frame 3 has arrived out of sequence, one frame time after RLP frame 4 was received, filling the hole for RLP frame 3. Before the RLP frame is received, the expected sequence number, V(R) 606D equals 4. Because the received SEQ number of the received RLP frame, SEQ 604D, is less than the expected sequence number V(R) 606D, the RLP frame is passed to the next protocol layer, and L_V(R) is incremented to 5, due to the reception of a new RLP frame. At this time, RLP frames 1 through 3 have been passed to the upper protocol layer, and RLP frame 4 is in the resequencing queue. V(N) is set to value of 5, equal to V(R) 606D, as the hole created by delayed RLP frame 3 has been filled. The resequencing queue 610D is checked and RLP frame 4 is sequentially passed to the next protocol layer, leaving the resequencing queue empty. The timers for the NAK messages are turned off and the NAK messages are purged from the NAK Q because the hole has been filled. The system is ready to receive the next new RLP frame.

Figure 7:
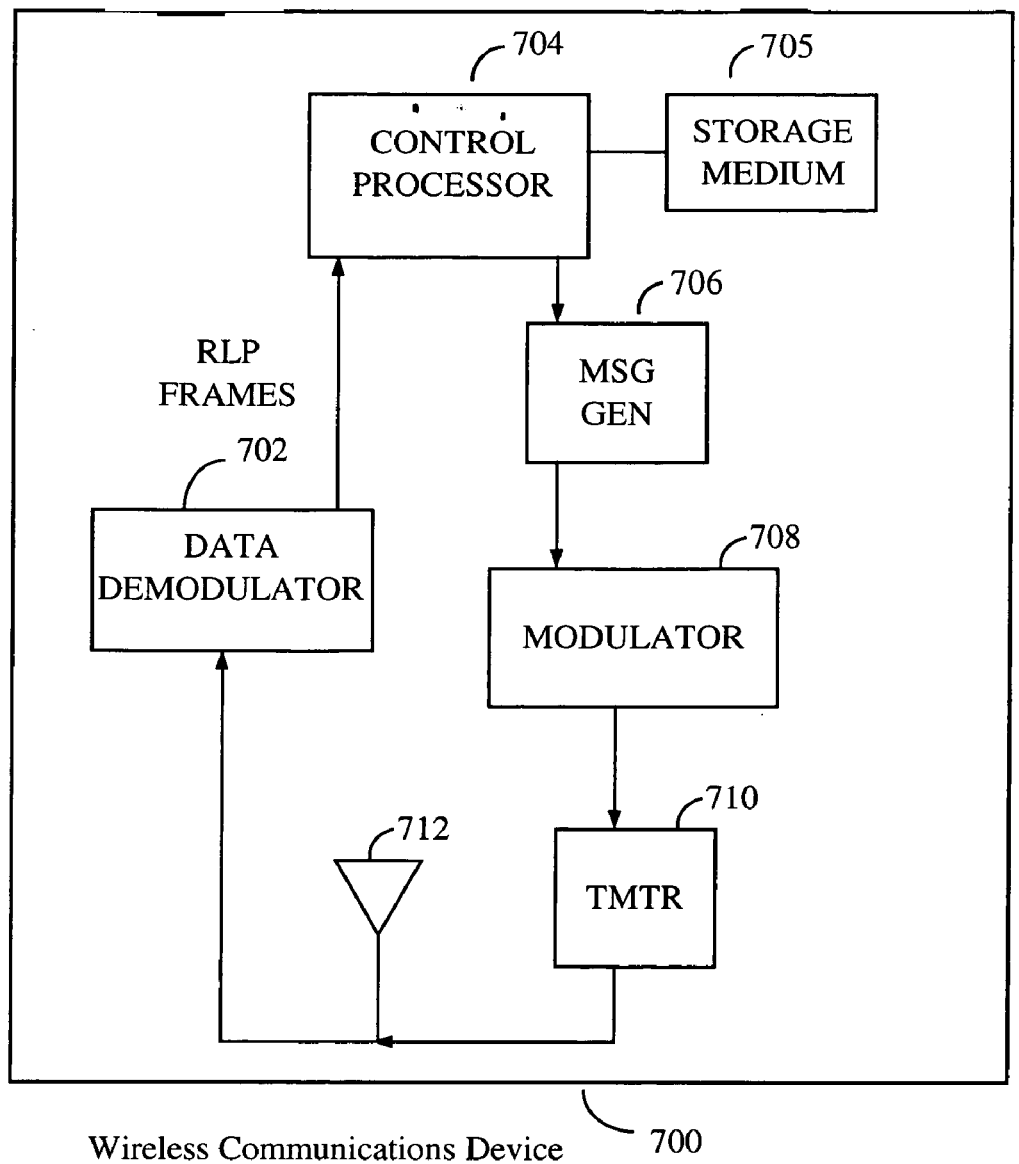
FIG. 7 is a block diagram of apparatus for performing delayed frame detection in RLP3.

FIG. 7 illustrates wireless communications apparatus for performing delayed frame detection in RLP3. Wireless communications apparatus for performing delayed frame detection in RLP3 comprises wireless devices that send or receive RLP3 frames, such as mobile telephones, base station transceiver subsystems, and wireless data terminals.

Wireless communications signals are received by wireless device 700 at antenna 712. Antenna 712 is a transducer that converts radio-frequency (RF) fields into alternating current (AC) or vice-versa. Antenna 712 intercepts RF energy and delivers AC to electronic equipment. The received analog signal reaches antenna element 712, is downconverted to a baseband analog signal, and is further converted to digital RLP frames by data demodulator element 702.

After demodulation, the data frames pass to control processor 704. Control processor 704 performs delayed frame detection. Control processor 704 passes sequential RLP frames to higher protocol layers, and buffers unsequential RLP frames and NAK messages for missing RLP frames.

Control processor 704 performs its operations using a set of instructions, contained in storage medium 705.

One skilled in the art would understand that storage medium 705 could be integral to control processor 704. It is also understood by those of skill in the art that processors may encompass a digital signal processor (DSP), an application-specific integrated circuit (ASIC), discrete gate logic, firmware, or any conventional programmable software module and a microprocessor. The software module could reside in RAM memory, flash memory, registers, or any other form of storage medium known in the art. Alternatively, any conventional processor, controller, or state machine could be substituted for the microprocessor.

The control processor 704 instructs the message generator 706 to generate NAK messages for missing RLP frames.

The messages are modulated by modulator 708 and transmitted to peer wireless communications devices from antenna 712.

The presently disclosed embodiments provide a method of delayed RLP frame detection, handing and sequencing for upper protocol layers.

Thus, a novel and improved method and apparatus for delayed frame detection in RLP3 has been described. Those of skill in the art would understand that the data, instructions, commands, information, signals, bits, symbols, and chips that may be referenced throughout the above description are represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. As illustrated in FIG. 7, an exemplary processor 704 is coupled to a storage medium 705 so as to read information from, and write information to, the storage medium 705. In the alternative, the storage medium 705 may be integral to the processor 704. The processor 704 and the storage medium 705 may reside in an ASIC (not shown).

The ASIC may reside in a telephone (not shown). In the alternative, the processor 704 and the storage medium 705 may reside in a telephone. The processor 704 may be implemented as a combination of a DSP and a microprocessor, or as two microprocessors in conjunction with a DSP core, etc.

The previous description of the preferred embodiments is provided to enable any person skilled in the art to make or use the disclosed embodiments. The various modifications to these embodiments will be readily apparent to those skilled in the art, and the generic principles defined herein may be applied to other embodiments without the use of the inventive faculty. Thus, the disclosed embodiments are not intended to be limited to the embodiments shown herein but are to be accorded the widest scope consistent with the principles and novel features disclosed herein.

We claim:

1. A method for detecting delayed Radio Link Protocol frames, and preventing the transmission of unnecessary Negative Acknowledgement messages and data frame retransmissions, comprising the steps of:
    buffering an unsequentially received Radio Link Protocol frame received on a first channel;
    withholding the transmission of a Negative Acknowledgement message for a delayed Radio Link Protocol frame until the delayed Radio Link Protocol frame has been missing longer than a predefined time period; and
    monitoring the first channel and a second channel for the delayed Radio Link Protocol frame, wherein the first and second channel are code-multiplexed to allow concurrent transmission of the unsequentially received Radio Link Protocol frame and the delayed Radio Link Protocol frame, and further wherein the second channel is configured to allow transmission of Radio Link Protocol frames within physical layer frames of different lengths than that of physical layer frames of the first channel.

2. The method of claim 1 further comprising the step of assigning a timer/counter to the buffered Radio Link Protocol frame for determining the necessity of transmitting a Negative Acknowledgment message for an unreceived Radio Link Protocol frame.

3. The method of claim 1 further comprising the steps of:
    buffering a Negative Acknowledgement message for an unreceived Radio Link Protocol frame; and
    assigning a timer/counter to the buffered Negative Acknowledgement message to prevent unnecessary transmission of the Negative Acknowledgement message if the unreceived Radio Link Protocol frame arrives before the expiration of a predefined time period.

4. The method of claim 1 further comprising the step of delaying updating the expected sequence number until a delayed Radio Link Protocol frame has been received.

5. A wireless communications device configured to detect delayed Radio Link Protocol frames, and prevent the transmission of unnecessary Negative Acknowledgement messages and data frame transmissions, comprising:
    a processor; and
    a storage medium coupled to the processor and containing a set of instructions executable by the processor to buffer an unsequentially received Radio Link Protocol frame received on a first channel;
    withhold the transmission of a Negative Acknowledgement message for a delayed Radio Link Protocol frame until the delayed Radio Link Protocol frame has been missing longer than a predefined time period; and
    monitoring the first channel and a second channel for the delayed Radio Link Protocol frame, wherein the first and second channel are code-multiplexed to allow concurrent transmission of the unsequentially received Radio Link Protocol frame and the delayed Radio Link Protocol frame and further wherein the second channel is configured to allow transmission of Radio Link Protocol frames within physical layer frames of a different length than that of physical layer frames of the first channel.

6. The wireless communications device or claim 5, wherein:
    the set of instructions is further executable by the processor to assign a timer/counter to the buffered Radio Link Protocol frame to determine the necessity of transmitting a Negative Acknowledgement message for an unreceived Radio Link Protocol frame.

7. The wireless communications device of claim 5, wherein:
    the set of instructions is further executable by the processor to buffer a Negative Acknowledgement message for an unreceived Radio Link Protocol frame; and
    assign a timer/counter to the buffered Negative Acknowledgement message to prevent unnecessary transmission of the Negative Acknowledgement message if the unreceived Radio Link Protocol frame arrives before the expiration of a predefined time period.

8. The wireless communications device of claim 5, wherein:
    the set of instructions is further executable by the processor to delay updating the expected sequence number until a delayed Radio Link Protocol frame has been received.

9. The wireless communications device of claim 5, wherein:
    the device is a base station transceiver.

10. The wireless communications device of claim 5, wherein:
    the device is a mobile telephone.

11. The wireless communications device of claim 5, wherein:
    the device is a data terminal.

12. A wireless apparatus for detecting delayed Radio Link Protocol frames, and preventing the transmission of unnecessary Negative Acknowledgement messages and data frame retransmissions, comprising:
    means for buffering an unsequentially received Radio Link Protocol frame received on a first channel;
    means for withholding the transmission of a Negative Acknowledgement message for a delayed Radio Link Protocol frame until the delayed Radio Link Protocol frame has been missing longer than a predefined time period; and
    monitoring the first channel and a second channel for the delayed Radio Link Protocol frame, wherein the first and second channel are code-multiplexed to allow concurrent transmission of frames the unsequentially received Radio Link Protocol frame and the delayed Radio Link Protocol frame, and further wherein the second channel is configured to allow transmission of Radio Link Protocol frames within physical layer frames of a different length than that of physical layer frames of the first channel.

13. The wireless apparatus of claim 12 further comprising:
    means for assigning a timer/counter to the buffered Radio Link Protocol frame for determining the necessity of transmitting a Negative Acknowledgement message for an unreceived Radio Link Protocol frame.

* * * * *